United States Patent [19]

Kasahara et al.

[11] Patent Number: 4,939,546
[45] Date of Patent: Jul. 3, 1990

[54] ILLUMINATING DEVICE FOR COPIER

[75] Inventors: Nobuo Kasahara; Yukio Noguchi, both of Yokohama, Japan

[73] Assignee: Ricoh Company, Ltd., Tokyo, Japan

[21] Appl. No.: 310,001

[22] Filed: Feb. 8, 1989

Related U.S. Application Data

[63] Continuation of Ser. No. 20,903, Mar. 2, 1987, abandoned.

[30] Foreign Application Priority Data

Feb. 28, 1986 [JP] Japan .................. 61-42998

[51] Int. Cl.⁵ .............. G03B 27/54; G03B 27/72; G03G 15/04
[52] U.S. Cl. ........................... 355/70; 355/35; 355/37; 355/69
[58] Field of Search ........... 355/32, 35, 37, 67, 355/69, 214, 70, 71, 326, 327

[56] References Cited

U.S. PATENT DOCUMENTS

| | | | |
|---|---|---|---|
| 2,403,711 | 7/1946 | Egan ........................ | 355/70 |
| 3,796,916 | 3/1974 | De Belder et al. ........ | 355/37 X |
| 3,841,752 | 10/1974 | Terajima et al. .......... | 355/70 X |
| 3,887,279 | 6/1975 | Rubin ........................ | 355/70 X |
| 4,527,093 | 7/1985 | Yamauchi et al. ........ | 355/69 |
| 4,565,441 | 1/1986 | Evans et al. .............. | 355/69 X |
| 4,668,081 | 5/1987 | Imamura .................... | 355/70 |

FOREIGN PATENT DOCUMENTS

| | | | |
|---|---|---|---|
| 2713910 | 10/1977 | Fed. Rep. of Germany .... | 355/37 |
| 0068877 | 4/1982 | Japan ........................ | 355/70 |
| 0176632 | 10/1983 | Japan ........................ | 355/70 |
| 0178443 | 10/1984 | Japan ........................ | 355/70 |
| 0032831 | 2/1986 | Japan ........................ | 355/70 |
| 2098344 | 4/1982 | United Kingdom .......... | 355/35 |

Primary Examiner—A. T. Grimley
Assistant Examiner—William J. Royer
Attorney, Agent, or Firm—Oblon, Spivak, McClelland, Maier & Neustadt

[57] ABSTRACT

An illuminating system for a photocopier utilizing plural lamps. The photocopier utilizes a single slit system with a single photoconductive element. A reflector carries a plurality of pairs of lamps along the longitudinal direction of the reflector. The corresponding lamps of each pair are connected in two lamp circuits which are separately controlled. the controller controls each circuit to be either off or have a controlled voltage applied to the circuit, where the voltage is variable in a number of steps.

3 Claims, 16 Drawing Sheets

ILLUMINATING DEVICE FOR COPIER

This is a continuation of application Ser. No. 020,903, filed on Mar. 2, 1987, now abandoned.

BACKGROUND OF THE INVENTION

The present invention relates to an illuminating device for an electrophotographic copier, particularly a color copier.

An illuminating device which is installed in a color copier generally includes color separating filters of different colors. Because each of the filters has a particular spectral transmission characteristic, the amount of exposure has to be varied from one color to another in order that exposure in the respective colors may be effected based on the difference in spectral transmission characteristics. To meet this requirement, it has been customary to selectively use different kinds of halogen lamps, fluorescent lamps and other light sources each being assigned to a respective one of the colors, or to vary voltage which is applied to a light source color by color.

However, a problem with the multiple light source scheme is that it needs a great number of structural units which increase the cost, while failing to attain sufficient reliability. Poor illumination efficiency due to limited efficiency of a reflector is another problem. On the other hand, the variable voltage scheme has a drawback that a change in voltage is accompanied by a change in color temperature and, therefore, the range of light adjustment available is quite limited.

SUMMARY OF THE INVENTION

It is therefore an object of the present invention to provide an illuminating device for an electrophtographic copier capable of saving power during operation of the copier.

It is another object of the present invention to provide an illuminating device for an electrophotographic copier capable of suppressing temperature elevation inside of the copier.

It is another object of the present invention to provide an illuminating device for an electrophotographic copier capable of enhancing and maintaining efficient illumination (efficient use of a reflector).

It is another object of the present invention to provide a cost-effective and reliable illuminating device for an electrophotographic copier.

It is another object of the present invention to provide an illuminating device for an electrophotographic copier capable of setting up proper amounts of exposure for respective colors (prevention of distortions due to changes in the color temperature of a halogen lamp) and promoting sure color balance adjustment (control of the amount of exposure).

It is another object of the present invention to provide a generally improved illuminating device for an electrophotographic copier.

An illuminating device of the present invention is installed in an electrophotographic copier of the type having a single slit exposing unit, a single photoconductive element, and an arrangement for performing a plurality of times of exposure and a corresponding number of times of development. The device comprises a single reflector extending in a lengthwise direction of the device, a plurality of lamps arranged along a center of emission of the reflector in a lengthwise direction of the reflector, and a controller for controlling a number of the lamps to be turned on at each of the plurality of times of exposure.

The above and other objects, features and advantages of the present invention will become more apparent from the following detailed description taken with the accompanying drawings.

DESCRIPTION OF THE PREFERRED EMBODIMENT

Figure 1:
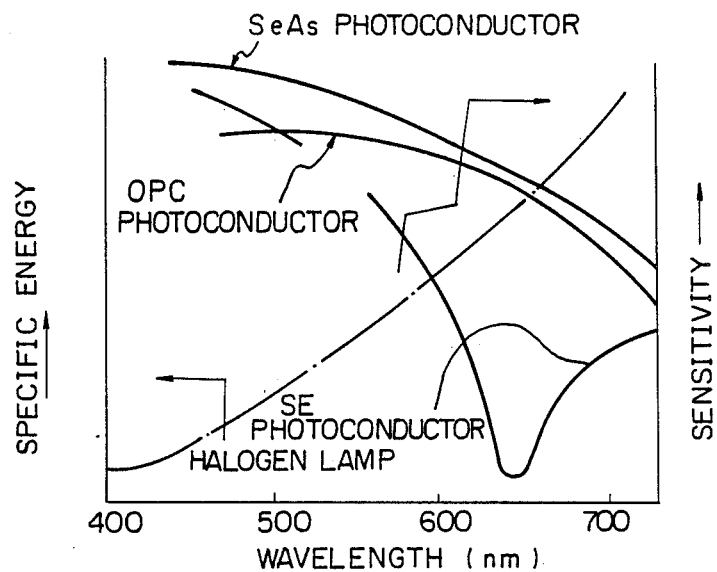
FIG. 1 is a plot showing the sensitivity of various kinds of photoconductors and the specific energy of a halogen lamp with respect to the wavelength of light.

Referring to FIG. 1 of the drawings, there are shown solid curves representative of exemplary sensitivity characteristics of various kinds of photoconductors and a dash-and-dot curve representative of exemplary specific energy of a halogen lamp, each with respect to the wavelength of light. As shown, a Se photoconductor in particular shows poor sensitivity to an intermediate wavelength range.

Figure 2:
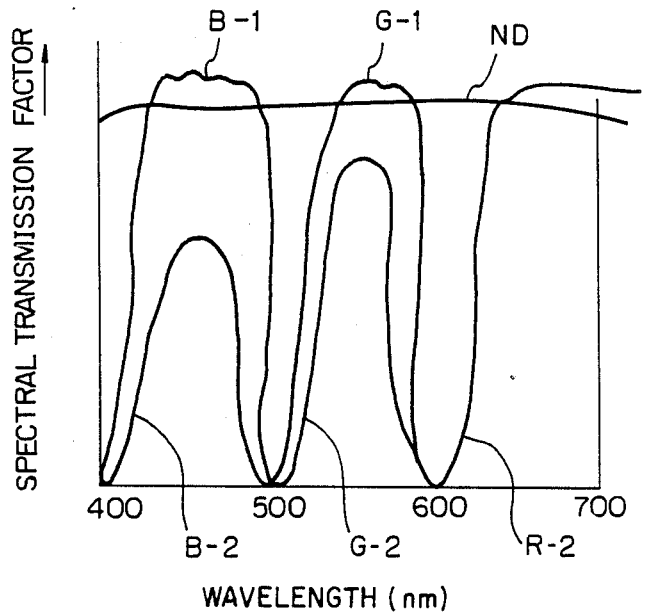
FIG. 2 is a plot showing the spectral transmission factors of color separating filters.

FIG. 2 shows exemplary spectral transmission factors of color separating filters with respect to the wavelength of light. In the plot of FIG. 2, a curve B-1 is representative of the spectral transmission characteristic of a blue laminate filter, a curve B-2 is representative of that of a blue dye filter, curves G1 and G2 are representative of, respectively, the spectral transmission characteristics of a green laminate and a green dye filters, a curve R-2 is representative of the spectral transmission characteristic of a red filter, and a curve ND is representative of an ND exposure characteristic.

Generally, in an illuminating device for a color copier, the amount of exposure required differs from one to another of predetermined colors, i.e., yellow (Y), magenta (M), cyan (C) and black (Bk) due to the difference in spectral transmission characteristic. It follows that in a color copier having a single slit the required capacity of a lamp, i.e., wattage differs from one color to another. In this situation, the most effective implementation for the cut-down of power consumption during the use of a copier (i.e. effective use) is changing the wattage of a lamp on a color-by-color basis.

Figure 3:
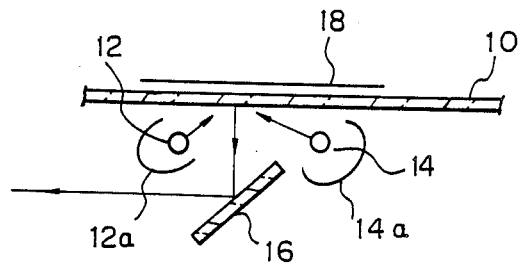
FIGS. 3 and 4 are schematic sections each showing a prior art illuminating device for a copier.

Referring to FIG. 3, an exemplary prior art copier with a single slit for exposure is shown. The copier includes a glass platen 10 to be loaded with a document 18, light sources, or lamps, 12 and 14, reflectors 12a and 14a associated with the lamps 12 and 14, respectively, and a mirror 16. In this example, two independent illuminating devices are installed. Specifically, the lamps 12 and 14 of the same kind which may be implemented with halogen lamps or fluorescent lamps are selectively turned on depending upon the color in the event of exposure. The lamps 12 and 14 may be comprised of different kinds of light sources, if desired. In any case, such a prior art arrangement needs a prohibitive number of structural units which add to the cost, while the reliability attainable therewith is poor, as previously discussed. In addition, the efficiency of the reflectors and, therefore, the illuminating efficiency is unsatisfactory.

In another arrangement known in the art, not shown, an illuminating device is provided with one or more lamps such as halogen lamps and constructed such that the voltage applied to the lamp or lamps is varied to control light at each time of exposure. This suffers from a drawback that, as previously stated, a change in voltage is accompanied by a change in color temperature, resulting in a limited light control range.

Figure 4:
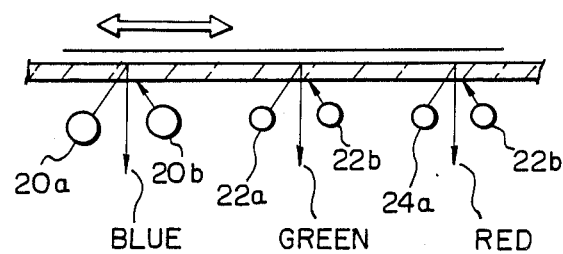

Referring to FIG. 4, an exemplary prior art color coupier having a plurality of slits for exposure is shown. The copier includes blue fluorescent lamps 20a and 20b, green fluorescent lamps 22a and 22b, and red fluorescent lamps 24a and 24b. Such a scheme cannot avoid complicated construction due to the use of numerous structural units, aggravating the cost performance.

Figure 5:
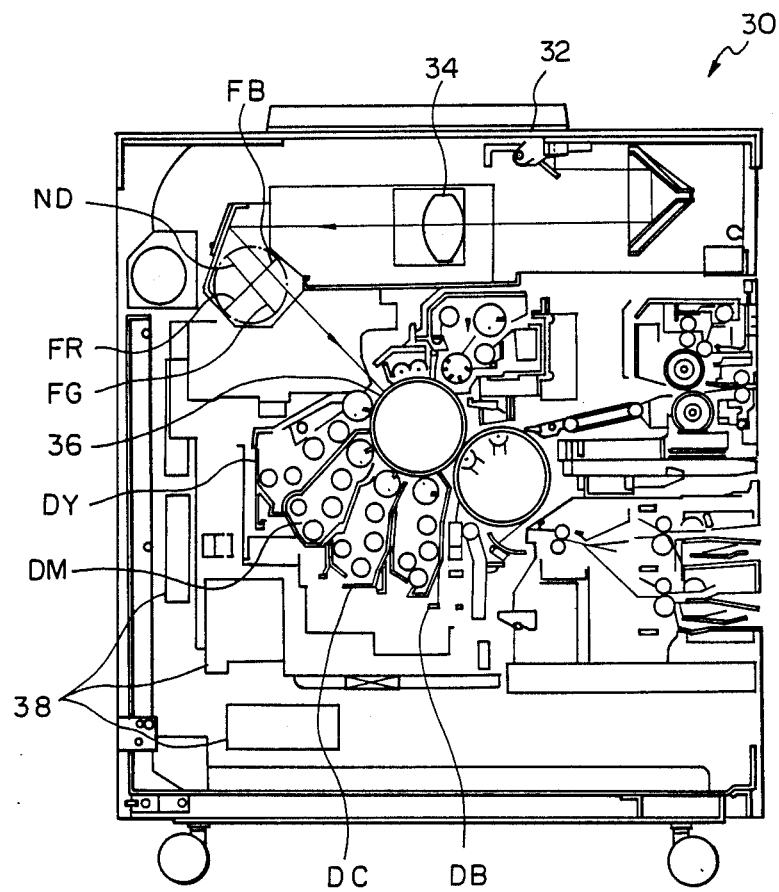
FIG. 5 is a schematic sectional side elevation of a color copier in which an illuminating device in accordance with the present invention is installed.
Figure 6:
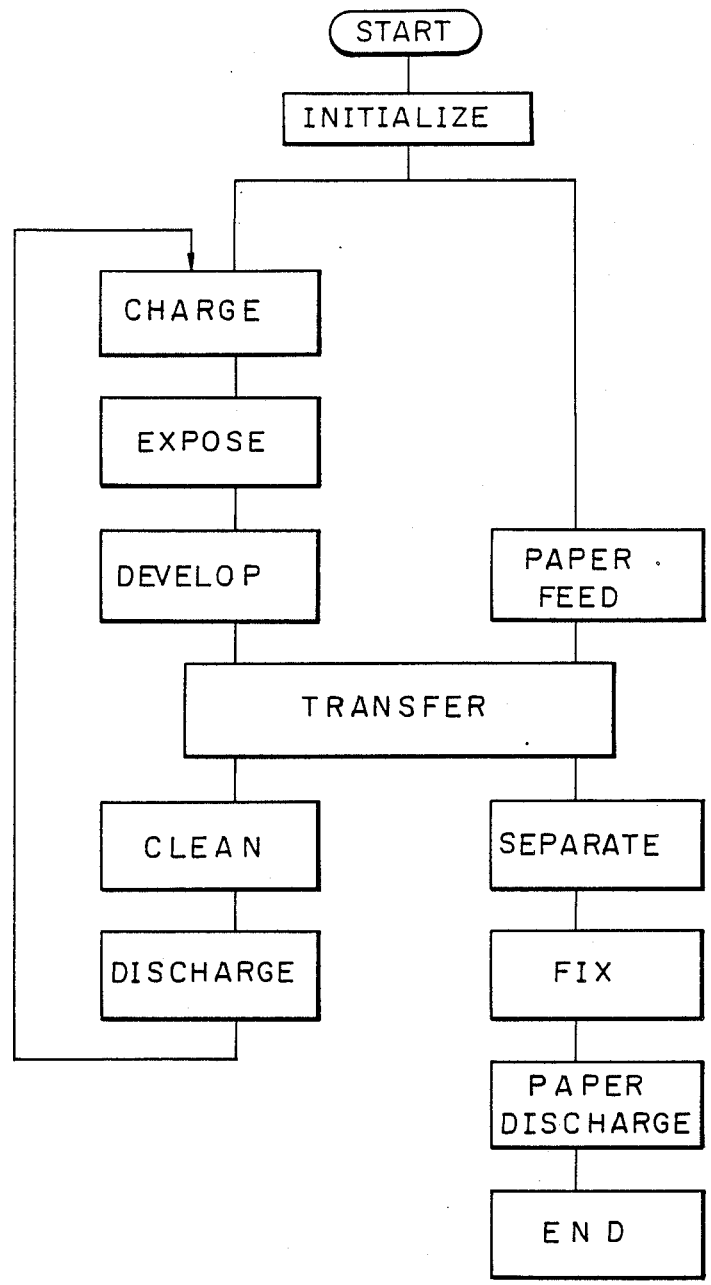
FIG. 6 is a flowchart outlining the operation of the copier with the device of the present invention.

Referring to FIG. 5, there is shown a color copier with an illuminating device embodying the present invention which is free from the problems as discussed above. The copier, generally 30, is provided with halogen lamps, reflectors, a slit regulator plate, etc. The reflectors comprise a main reflector and an auxiliary reflector and serve to converge light issuing from the halogen lamps toward a document surface 32. Light reflected by the document surface 32 is focused on a photoconductive element 36 by mirrors, an optical system 34, and any of predetermined color separating filters FB, FG, FR and ND, forming an electrostatic latent image on the element 36. One of developing units DY, DM, DC and DB, which are arranged around the element 36, that corresponds to the characteristic of the filter is actuated to develop the latent image on the element 36 with a toner. Designated by the reference numeral 38 are power source sections of the copier 30. The general operation of the copier is schematically shown in a flow chart in FIG. 6.

Figure 7:
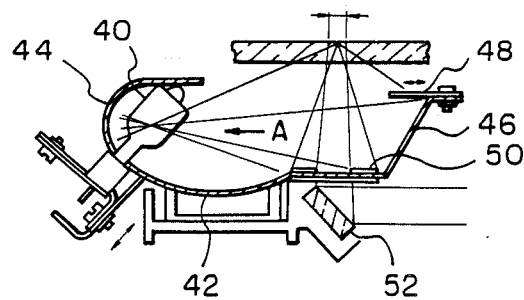
FIG. 7 is a fragmentary enlarged section of the illuminating device as shown in FIG. 5.
Figure 8:
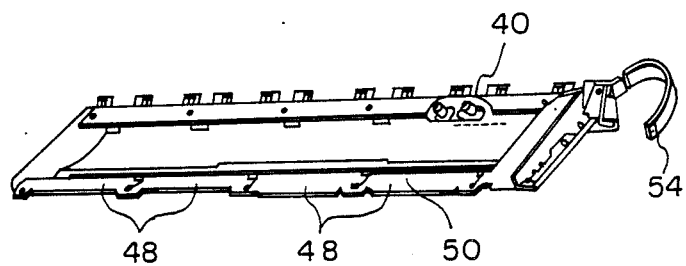
FIG. 8 is a fragmentary perspective view of the same device.
Figure 9:
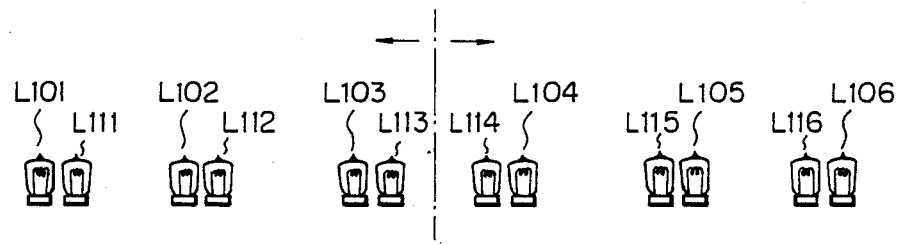
FIG. 9 is a view of halogen lamps which are arranged in the illuminating device.

Referring to FIGS. 7, 8 and 9, the illuminating device in accordance with the present invention includes six pairs of spherical halogen lamps 40 which are arranged in an array. As shown in FIG. 9, which is a perspective view as seen in a direction A of FIG. 7, lamps L101 to L106 are positioned substantially symmetrically with respect to the longitudinal center line of the device, while lamps L111 to L116 are positioned in the vicinity of and slightly inward (on the center line side) of the lamps L101 to L106, respectively. In FIG. 7, the reference numeral 42 designates a main reflector associated with the lamps 40 and provided with a substantially oval or parabolic section in a direction perpendicular to its longitudinal direction. The emitting portions of the lamps 40 are positioned on the line of focus of the surface of the main reflector 42. A diffusion surface 44 which is painted white is provided in contact with the inner surface of the reflector 42. An auxiliary reflector 46 is located to face the reflector 42 so as to reflect light from the lamps 40 and reflector 42, thereby illuminating the document surface 32. A flat illumination compensator 48 is provided along the other edge of the reflector 46 and made up of a plurality of discrete fragments. Essentially, the illumination compensator 48 comprises light intercepting plates each being capable of moving into and out of an optical path independently of the others. These plates are so located as to cooperate with the lamps L101 to L116 to set up a uniform distribution of light which is directed toward the document surface. A slit regulator plate 50 is interposed between the reflectors 42 and 46. Light from a document is propagated through the slit regulator plate 50 and, then, reflected by a first mirror 52 toward a selected one of the color filters.

Figure 10:
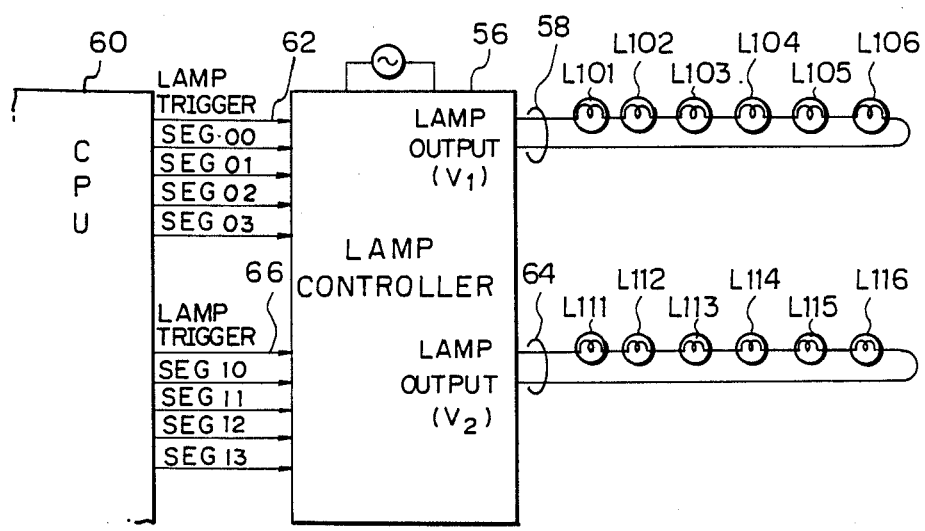
FIG. 10 is a diagram representative of a control circuit associated with the illuminating device.

As shown in FIG. 8, a flat cable 54 is provided for turning on and off the lamps 40 and comprised of flexible wires. The other end of the cable 54 is connected to a control unit 56, which is shown in FIG. 10. As shown in Table 1 below, the output 58 of a series connection of the halogen lamps L101 to L106 is variable by varying the combination of ON- and OFF-states of signals SEG00 to SEG03 which are outputted by a central processing unit (CPU) 60.

Specifically, Table 1 is representative of the control of voltage which is applied to the halogen laps L101 to L106. For example, when all the signals SEG00 to SEG03 are OFF, a voltage of 62.5 volts is applied from the lamp output 58 to the lamps L101 to L106 while, when all the signals SEG00 to SEG03 are ON, a voltage of 85.0 volts is applied to the lamps L101 to L106. However, it is only when a lamp trigger signal 62 is ON that the voltage appearing on the lamp output 58 is fed to the lamps as stated above; if the signal 62 is OFF, the output voltage 58 is zero volt. Likewise, voltage appearing on a lamp output 64, which is associated with the other lamps L111 to L116, is variable based on the combination of ON- and OFF-states of signals SEG10 to SEG13, as shown in Table 2. The reference numeral 66 designates a lamp trigger signal which is the same in function as the trigger signal 62.

TABLE 1

| SEG 03 | SEG 02 | SEG 01 | SEG 00 | LAMP OUTPUT 58 (V) |
|---|---|---|---|---|
| ON | ON | ON | ON | 85.0 |
| ON | ON | ON | OFF | 83.5 |
| ON | ON | OFF | ON | 82.0 |
| ON | ON | OFF | OFF | 80.5 |
| ON | OFF | ON | ON | 79.0 |
| ON | OFF | ON | OFF | 77.5 |
| ON | OFF | OFF | ON | 76.0 |
| ON | OFF | OFF | OFF | 74.5 |
| OFF | ON | ON | ON | 73.0 |
| OFF | ON | ON | OFF | 71.5 |
| OFF | ON | OFF | ON | 70.0 |
| OFF | ON | OFF | OFF | 68.5 |
| OFF | OFF | ON | ON | 67.0 |
| OFF | OFF | ON | OFF | 65.5 |
| OFF | OFF | OFF | ON | 64.0 |
| OFF | OFF | OFF | OFF | 62.5 |

TABLE 2

| SEG 13 | SEG 12 | SEG 11 | SEG 10 | LAMP OUTPUT 16 (V) |
|---|---|---|---|---|
| ON | ON | ON | ON | 85.0 |
| ON | ON | ON | OFF | 83.5 |
| ON | ON | OFF | ON | 82.0 |
| ON | ON | OFF | OFF | 80.5 |
| ON | OFF | ON | ON | 79.0 |
| ON | OFF | ON | OFF | 77.5 |
| ON | OFF | OFF | ON | 76.0 |
| ON | OFF | OFF | OFF | 74.5 |
| OFF | ON | ON | ON | 73.0 |
| OFF | ON | ON | OFF | 71.5 |
| OFF | ON | OFF | ON | 70.0 |
| OFF | ON | OFF | OFF | 68.5 |
| OFF | OFF | ON | ON | 67.0 |
| OFF | OFF | ON | OFF | 65.5 |
| OFF | OFF | OFF | ON | 64.0 |
| OFF | OFF | OFF | OFF | 62.5 |

An illuminating device of a color copier exposes a photoconductive element by passing a spectral radiation flux from a light source through any of different color filters and, hence, requires about three times greater amount of light than that of a monochromatic copier for a photoconductive element having certain sensitivity. When the spectral characteristics of a photoconductive element, color separation filters (B, G, R and ND), halogen lamps and others, which are used in a particular embodiment of the present invention, were combined, the power (W) necessary to obtain adequate amounts of exposure for the respective colors were calculated as follows:

| black image (exposure with ND filter) | 205 watts | |
| yellow image (exposure with B filter) | 540 watts | average |
| magenta image (exposure with G filter) | 250 watts | 330 watts |
| cyan image (exposure with R filter) | 200 watts | for full-color |

In the light of the above, use is made of halogen lamps L101 to L106 having a rated voltage of 85 volts and a rated power of 250 watts, and halogen lamps L111 to L1116 having a rated voltage of 85 volts and a rated power of 400 watts.

Hereinafter will be described the operation of the lamp control unit, or lamp controller, 56 with reference to FIG. 11 and Tables 1 and 2.

Figure 11:
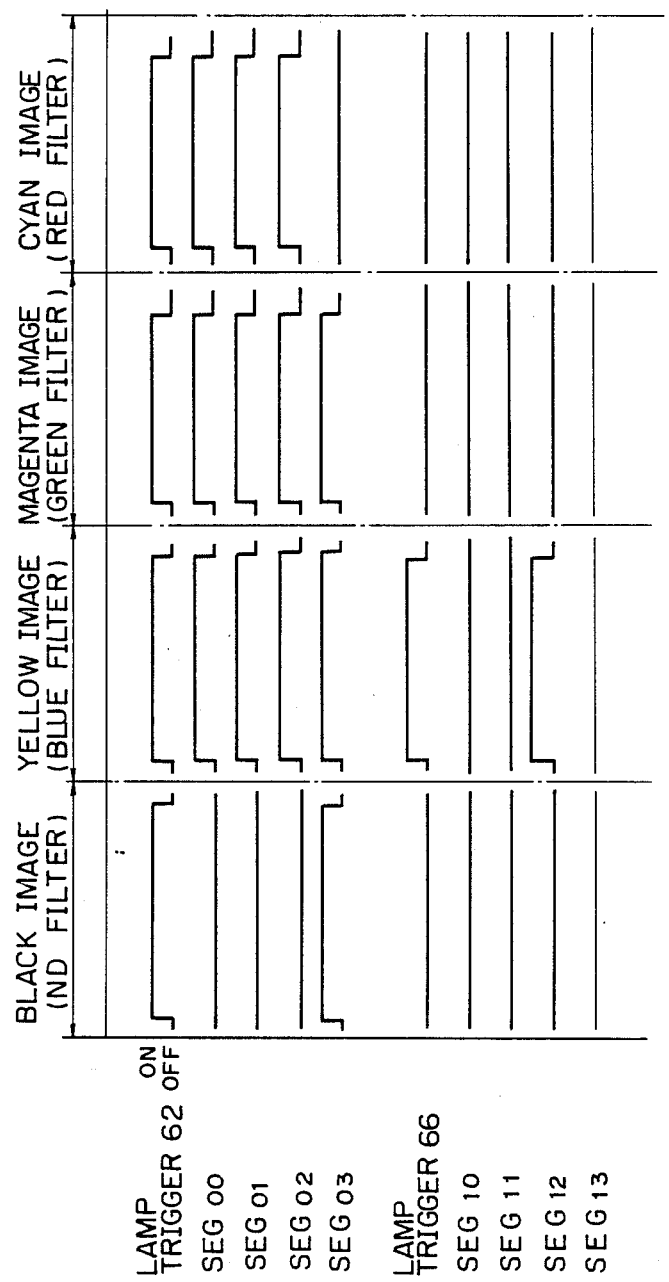
FIG. 11 is a timing chart demonstrating control operations.

Firstly, to form a black image, the lamp trigger signal 62 is made ON to turn on the lamps L101 to L106 while the trigger signal 66 and, therefore, the lamps L111 to L116 are maintained OFF, as shown in FIG. 11. Voltage $V_1$ on the lamp output 58 which is necessary for the required lamp power of 205 watts is expressed as:

$$V_1 = (W/W_0)^{1/k} \times V_0$$

where W denotes the necessary lamp power, $W_0$ the rated lamp power (250 watts), $V_0$ the rated lamp voltage (85 volts), and K a constant.

Hence, $$V_1 = (205/250)^{1/1.54} \times 85$$
$$\approx 74.5 \text{ (volts)}$$

To provide a voltage of 74.5 volts on the lamp output 58 and, therefore, an adequate amount of exposure, only the signal SEG03 is turned ON with the others SEG00 to SEG02 maintained OFF as shown in Table 1.

Regarding a yellow image, both of the lamp trigger signals 62 and 66 are turned ON to energize the lamps L111 to L116. A voltage of 85 volts is applied to the lamps L101 to L106 to provide a part, 250 watts, of the necessary lamp power which is 540 watts. In order that the remaining 290 watts of the lamp power may be achieved with the other lamps L111 to L116, applied to the lamp output 64 is a voltage $V_2$ which is produced by:

$$V = (290/400)^{1/1.54} \times 85$$
$$\approx 68.5 \text{ (volts)}$$

It will be seen from Tables 1 and 2 that by turning ON the signals SEG00 to SEG03 and SEG12 and turning OFF the signals SEG 10, SEG11 and SEG13 the above-mentioned power is obtained.

As for a magenta image, the lamp trigger signal 62 is made ON to turn on the lamps L101 to L106 while the lamp trigger signal 66 and, therefore, the lamps L111 to L116 are maintained OFF, as shown in FIG. 11. In this instance, because the voltage $V_1$ necessary for the lamp power of 250 watts to be provided is 85 volts, all the signals SEG00 to SEG03 are turned ON as shown in Table 1.

Further, as regards a cyan image, the lamp trigger signal 62 is turned ON to energize the lamps L101 to L106 with the other lamp trigger signal 66 maintained OFF. The lamp output 58 voltage $V_1$ which provides the necessary lamp power of 200 watts is produced by:

$$V_1 = (200/250)^{1/1.54} \times 85$$
$$= 73 \text{ (volts)}$$

Then, based on Table 1, an adequate amount of exposure is attainable by turning ON SEG00 to SEG022 and turning OFF SEG03.

When the amount of exposure is finely adjusted for the adjustment of color balance, settings of the signals SEG00 to SEG03 and SEG10 to SEG13 are changed and the number of lamps L101 to L106 and L111 to L116 to be turned on is controlled. Then, by using the lamps and the lamp controller in accordance with this embodiment, there is provided $$W = (V/V_0)^k \times W = (62.5/85)^{1.54} \times 250$$
$$\approx 155 \text{ (watts)}$$

The above equation shows that the lamp power is variable over a range as wide as 155 watts to 650 watts and, therefore, a sufficiently wide light amount range is attainable against the sensitivity of a photoconductive element.

Figure 12A:
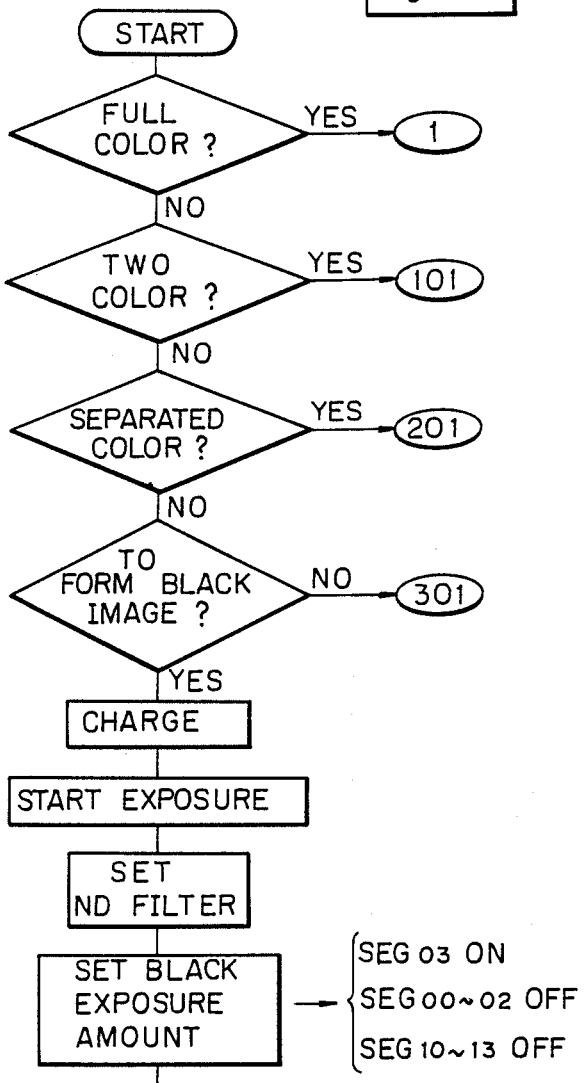
FIG. 12 is a flowchart showing a monochromatic black image copying procedure performed with the illuminating device of the present invention.
Figure 12B:
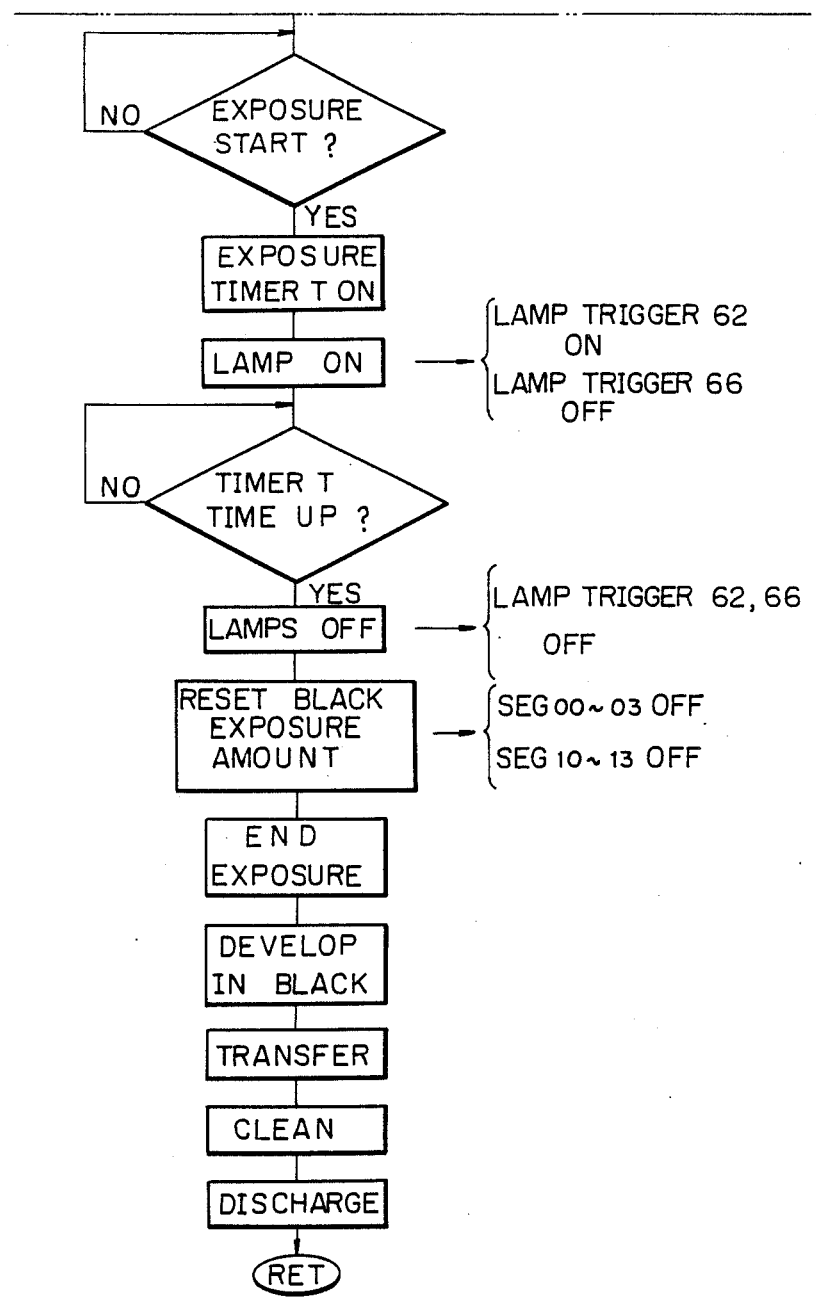

Referring to FIG. 12, there is shown a monochromatic (black image) copying procedure, mainly illuminating to developing and transferring steps, as performed by operating the copier 30 of FIG. 5. The flowchart of FIG. 12 is a detailed and practical version of the steps which are shown in the left-hand side in FIG. 6. At a step labelled "SET BLACK EXPOSURE AMOUNT" in FIG. 6, the signal SEG03 is turned ON while the signals SEG00 to SEG02 and SEG10 to SEG13 are turned OFF; at a step "LAMP ON", the lamp trigger signal 61 is ON and the lamp trigger signal 66 is OFF; at a step "LAMP OFF", the lamp trigger signals 62 and 66 are OFF; and at a step "RESET BLACK EXPOSURE AMOUNT", the signals SEG00 to SEG03 and SEG10 to SEG13 are OFF.

Figure 13:
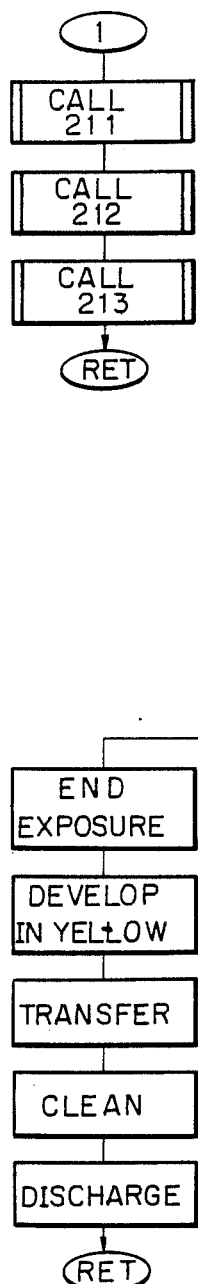
FIG. 13 is a flowchart showing a full-color copying procedure.
Figure 15:
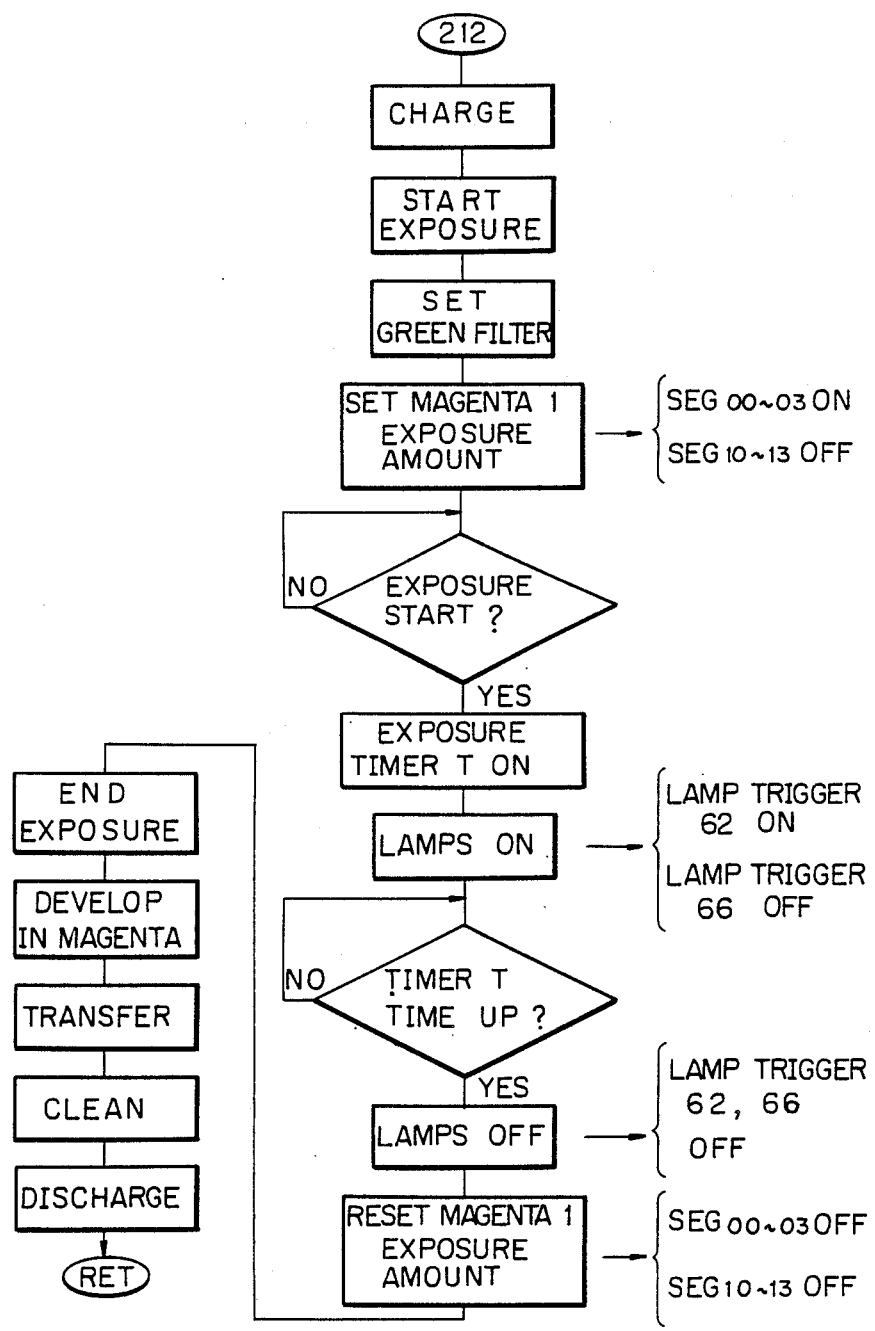
FIG. 15 is a flowchart showing a color separation type monochromatic magenta image color copying procedure.
Figure 16:
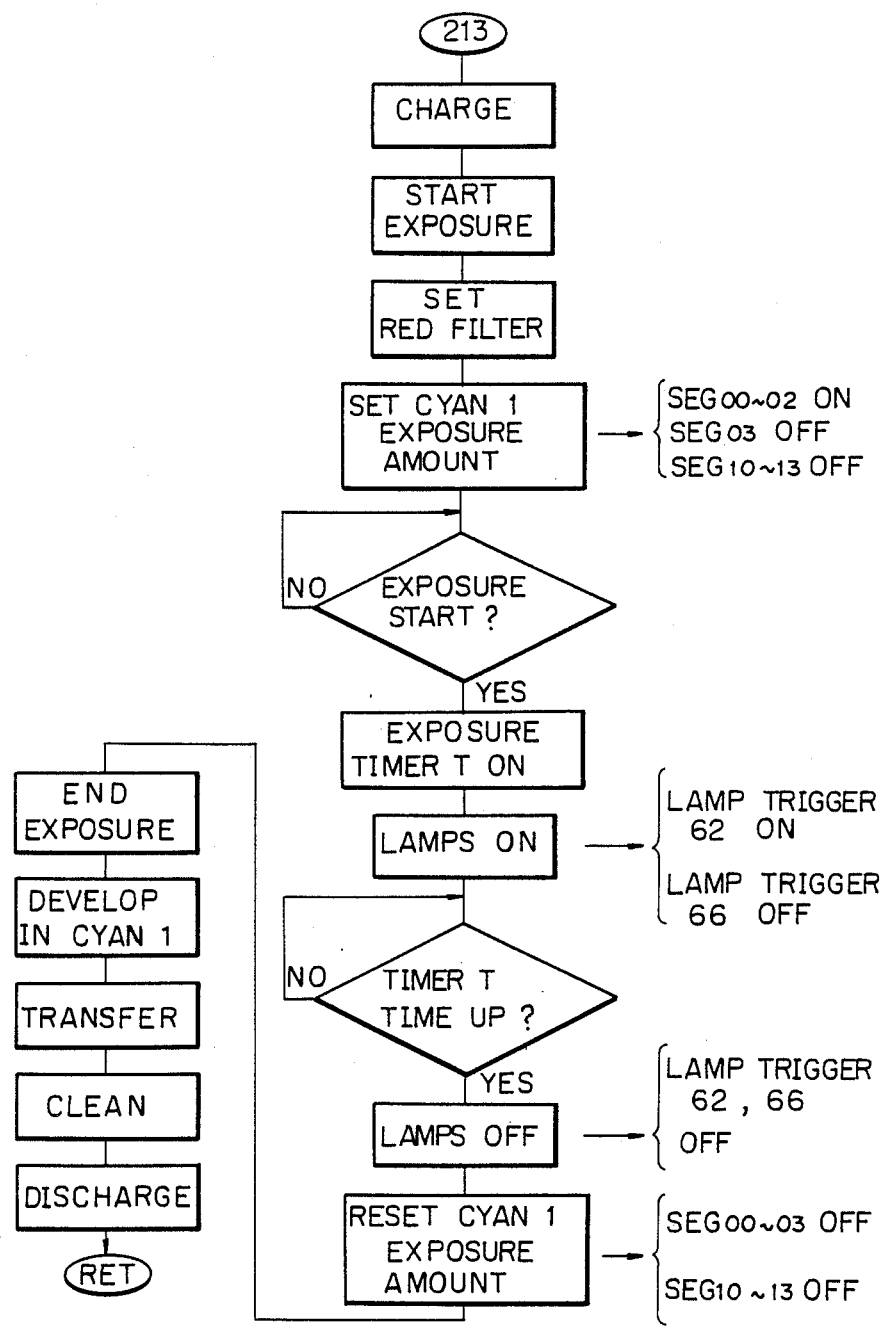
FIG. 16 is a flowchart showing a color separation type monochromatic cyan image color copying procedue.

Referring to FIG. 13, there is outlined a procedure for producing a full-color copy with the copier 30 of FIG. 5. In this case, yellow, magenta and cyan images are laid one upon another in this sequence. A step labelled "CALL 211" in FIG. 13 is shown in detail in FIG. 14 and representative of a monochromatic yellow image color copying operation; a step "CALL 212" corresponds to the flowchart of FIG. 15 which shows a monochromatic magenta image color copying operation; and a step "CALL 213" corresponds to the flowchart of FIG. 16 which shows a monochromatic cyan image color copying operation.

Figure 17:
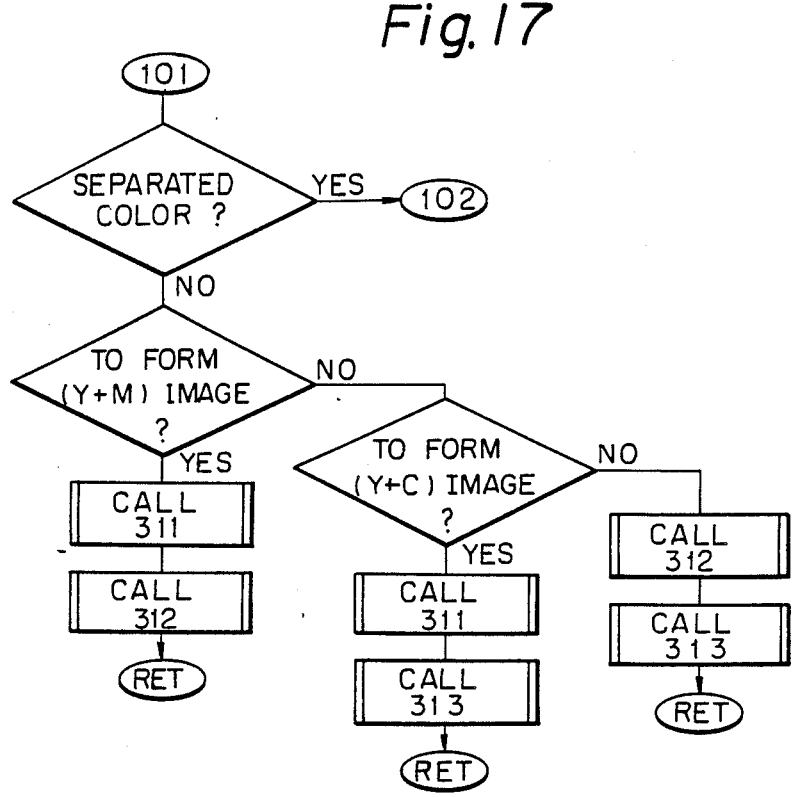
FIG. 17 is a flowchart showing a two-color copying procedure.
Figure 19:
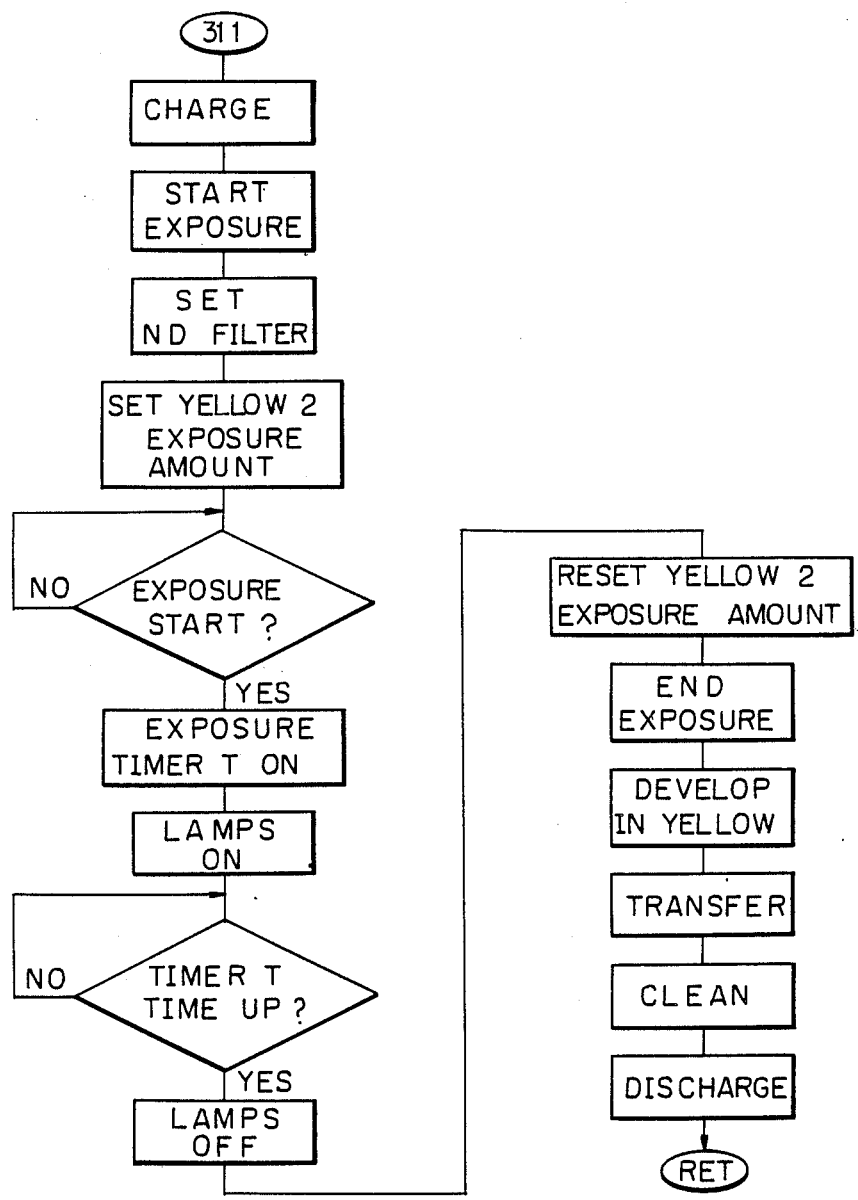
FIG. 19 is a flowchart showing a monochromatic yellow image color copying procedure.
Figure 20:
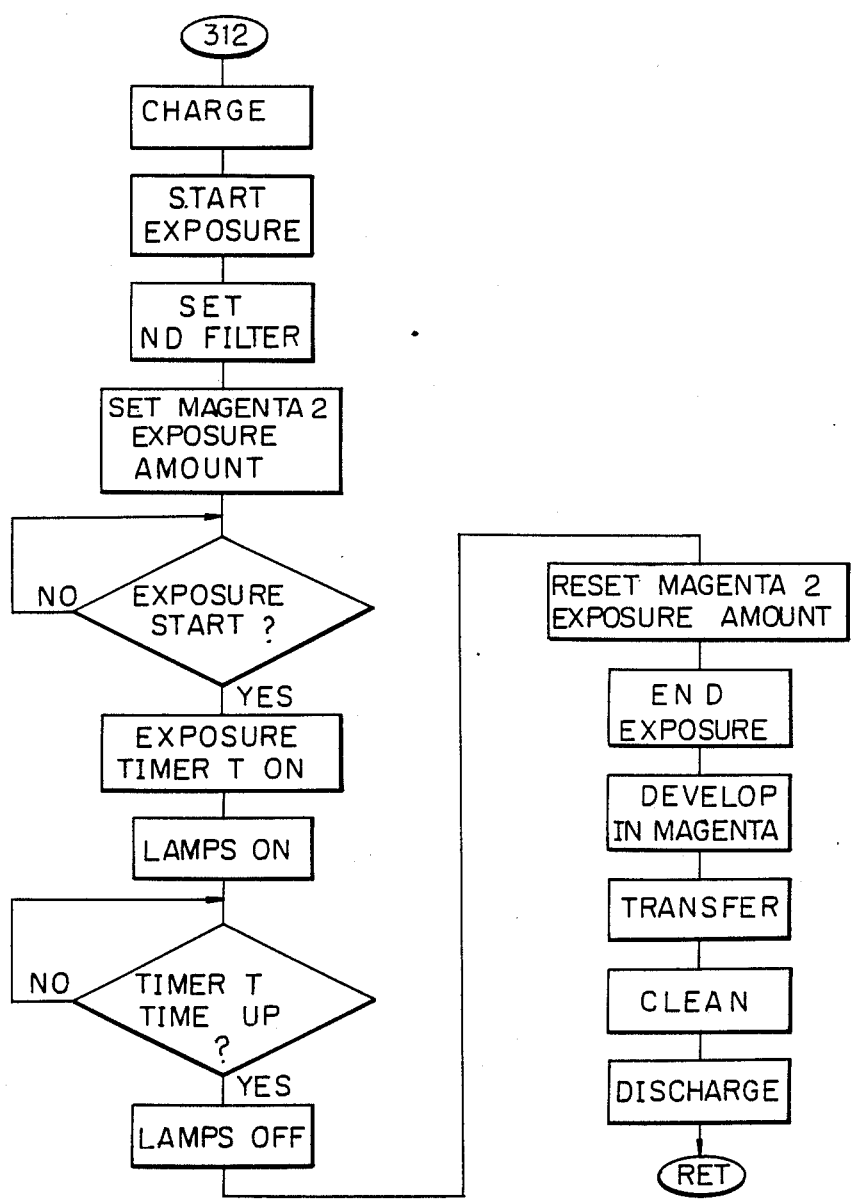
FIG. 20 is a flowchart showing a monochromatic magenta image color opying procedure.
Figure 21:
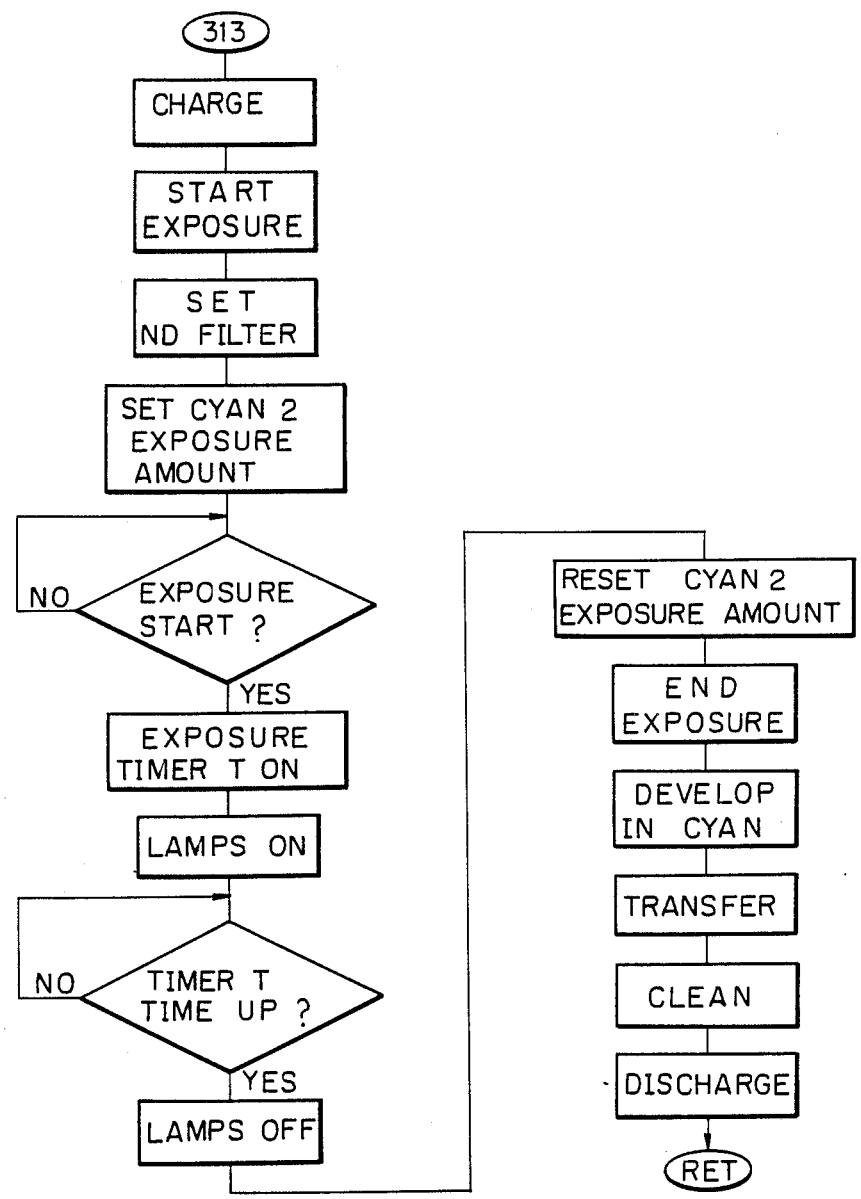
FIG. 21 is a flowchart showing a monochromatic cyan image copying procedure.

FIG. 17 shows a two-color copying operation in a flowchart. Specifically, the operation shown in FIG. 17 is adapted to produce a copy of a document by overlaying two-color images (e.g. Y+M, Y+C and M+C) and without separating the colors of the document. A step "102" shown in FIG. 17 corresponds to FIG. 18 which shows a color separation type two-color color copying operation, while steps "CALL 311", "CALL 312" and "CALL 313" are shown in detail in FIGS. 19, 20 and 21, respectively.

Figure 14:
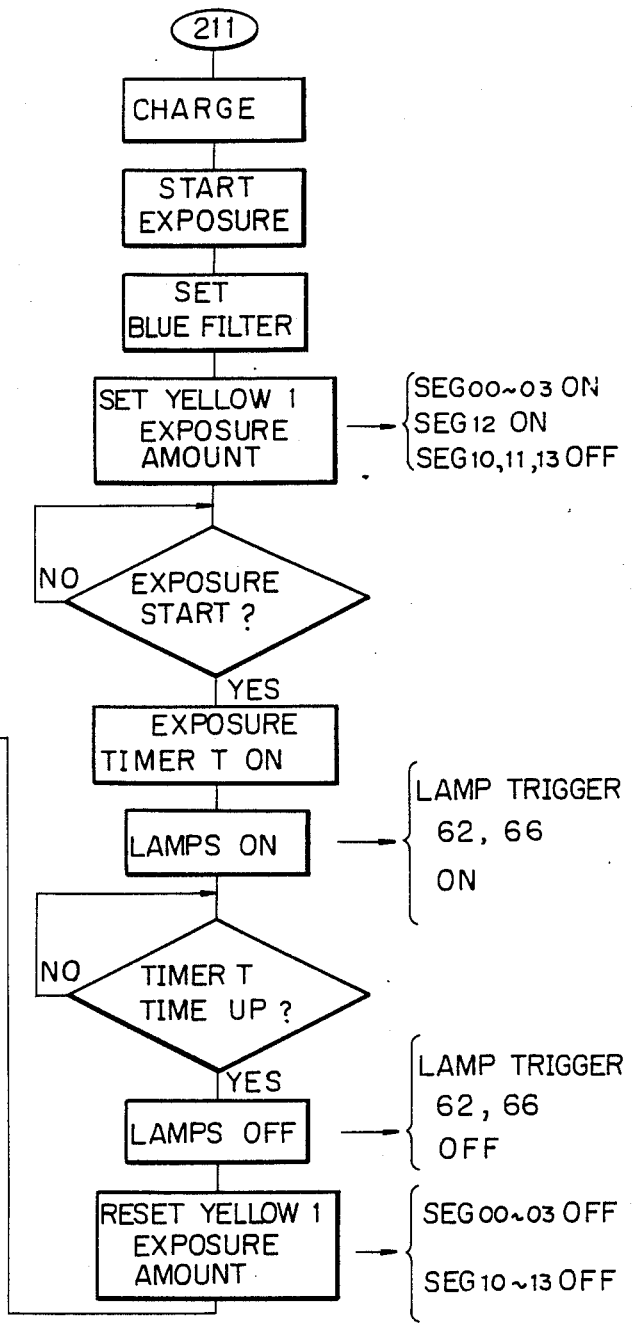
FIG. 14 is a flowchart showing a color separation type monochromatic yellow image color copying procedure.
Figure 18:
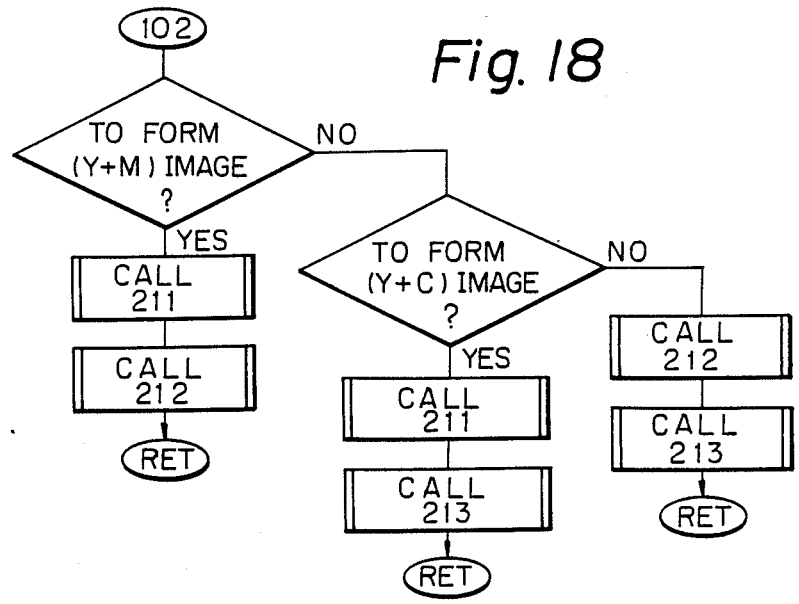
FIG. 18 is a flowchart showing a color separation type two-color color copying procedure.

In FIG. 18, two-color images (e.g. Y+M, Y+C and M+C) which are provided by separating the colors of a document before exposure are laid upon upon the other to produce a copy. Steps "CALL 211", "CALL 212" and "CALL 213" are shown in detail in FIGS. 14, 15 and 16, respectively. FIG. 14 is representative of a color separation type monochromatic yellow image color copying procedure, FIG. 15 a color separation type monochromatic magenta image color copying procedure, and FIG. 16 a color separation type monochromatic cyan image color copying procedure.

Figure 22:
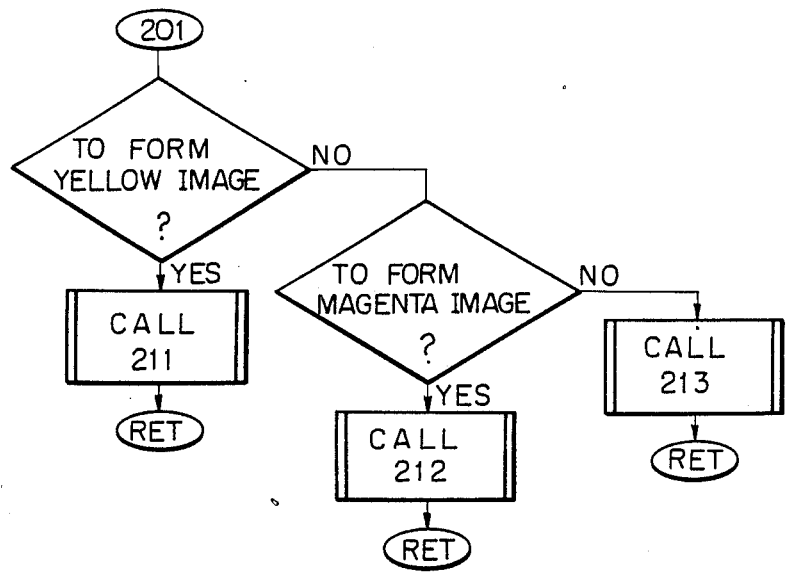
FIG. 22 is a flowchart showing a color separation type monochromatic color copying procedure.

FIG. 22 shows a color separation type monochromatic color copying procedure in which a monochromatic (Y, M or C) image is produced by separating the colors of a document according to a specified color image. Steps "CALL 211", "CALL 212" and "CALL 213" shown in FIG. 22 are shown in detail in FIGS. 14, 15 and 16, respectively.

Figure 23:
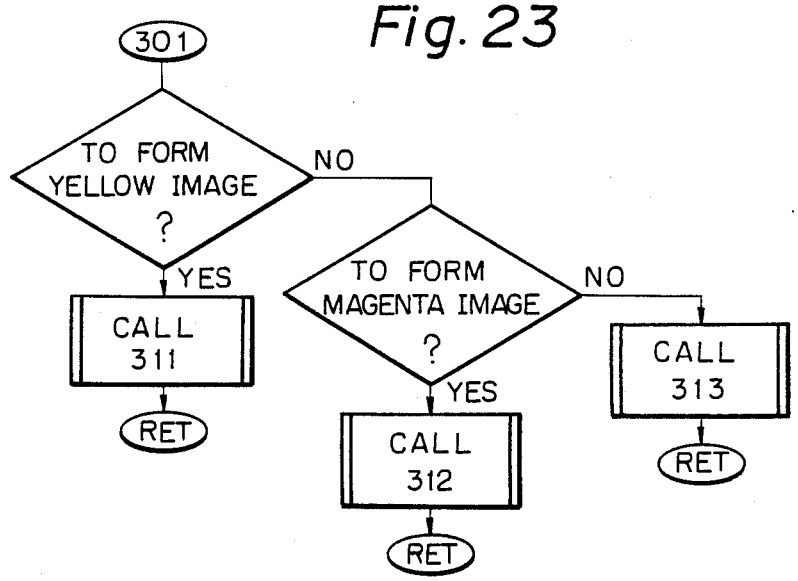
FIG. 23 is a flowchart showing a monochromatic color copying procedure.

FIG. 23 shows a monochromatic color copying operation in which a monochromatic (Y, M or C) copy is produced without separating the colors of a document according to a specified color image. Steps "CALL 311", "CALL 312" and "CALL 313" are shown in detail in FIGS. 19, 20 and 21, respectively.

As previously described, the lamp power in the illuminating device of the present invention is adjustable over a substantial range. This insures an adequate amount of exposure in any of the above-stated cases against the sensitivity characteristic of a photoconductive element, thereby offering copies with excellent color balance.

In summary, it will be seen that the present invention provides an illuminating device for an electrophotographic copier which saves power during operation of the copier and, therefore, suppresses temperature elevation inside of the copier, enhances and maintains efficient illumination, decreases the cost and increases the reliability, and insures adequate exposure in each of predetermined colors as well as color balance adjustment.

Various modifications will become possible for those skilled in the art after receiving the teachings of the present disclosure without departing from the scope thereof.

What is claimed is:

1. A lighting device for an electrophotographic color copier having a plurality of color copying cycles for illuminating a document, said copier including a single slit exposing means, a single photoconductive element, and a means for performing a plurality of times of exposure and a corresponding number of times of development, said plurality of times corresponding to the number of color copy cycles, said lighting device having at least a lengthwise direction and comprising:
    a single reflector extending in said lengthwise direction of said lighting device;
    a plurality of pairs of lamps arranged along a line of focus of said reflector in said lengthwise direction of said lighting device, a first lamp of each pair of lamps being connected in a first lamp circuit and a second lamp of each pair of lamps being connected in a second lamp circuit; and
    a control means for separately controlling the voltage applied to each of said first and second lamp circuits at each of said plurality of times of exposure corresponding to each color copying cycle to separately control the intensity of said lamps in each circuit and the number of circuits actuated, the total intensity of said lighting device being determined by the number of circuits actuated and the voltage applied to each circuit so that different total intensities occur for each color copying cycle.

2. The lighting device according to claim 1, wherein the voltage applied to each of said first and second lamp circuits is controlled in a stepwise fashion from a minimum voltage to a maximum voltage when the circuit is turned on.

3. The lighting device according to claim 2, further comprising a central processing unit for controlling said control means.

* * * * *